(12) United States Patent
Kawara

(10) Patent No.: US 8,330,979 B2
(45) Date of Patent: Dec. 11, 2012

(54) INFORMATION PROCESSING APPARATUS, PRINTING APPARATUS, CONTROL METHOD THEREFOR, INFORMATION PROCESSING SYSTEM, AND PROGRAM

(75) Inventor: Satoshi Kawara, Kawasaki (JP)

(73) Assignee: Canon Kabushiki Kaisha (JP)

( * ) Notice: Subject to any disclaimer, the term of this patent is extended or adjusted under 35 U.S.C. 154(b) by 1051 days.

(21) Appl. No.: 12/277,672

(22) Filed: Nov. 25, 2008

(65) Prior Publication Data

US 2009/0135448 A1 May 28, 2009

(30) Foreign Application Priority Data

Nov. 27, 2007 (JP) ................................ 2007-306301

(51) Int. Cl.
*G06F 3/12* (2006.01)
(52) U.S. Cl. ................. 358/1.15; 358/1.16; 358/426.05; 358/1.13
(58) Field of Classification Search ................ 358/1.15, 358/426.05, 426.07, 426.13, 1.16, 1.17, 1.13
See application file for complete search history.

(56) References Cited

U.S. PATENT DOCUMENTS

| | | | | |
|---|---|---|---|---|
| 7,061,633 B1 * | 6/2006 | Shima | ........................... | 358/1.15 |
| 7,092,117 B2 * | 8/2006 | Kageyama et al. | ........... | 358/1.18 |
| 7,130,069 B1 * | 10/2006 | Honma | ........................ | 358/1.15 |
| 7,567,360 B2 * | 7/2009 | Takahashi et al. | ............ | 358/1.15 |
| 7,607,141 B2 * | 10/2009 | Foehr et al. | .................... | 719/322 |
| 7,755,786 B2 * | 7/2010 | Foehr et al. | ................... | 358/1.15 |
| 7,889,382 B2 * | 2/2011 | Wakana | ........................ | 358/1.18 |
| 7,911,640 B2 * | 3/2011 | Nishikawa | .................... | 358/1.18 |
| 8,049,917 B2 * | 11/2011 | Noguchi et al. | ............. | 358/1.15 |
| 8,144,345 B2 * | 3/2012 | Nishikawa | ................... | 358/1.13 |
| 8,144,358 B1 * | 3/2012 | Montierth et al. | ............ | 358/1.16 |
| 2007/0002351 A1 * | 1/2007 | Yoshimura et al. | ........... | 358/1.13 |
| 2007/0055895 A1 * | 3/2007 | Okuda | ........................... | 713/193 |
| 2008/0244721 A1 * | 10/2008 | Barrus et al. | ....................... | 726/9 |
| 2009/0287709 A1 * | 11/2009 | Kusakabe | ......................... | 707/9 |

FOREIGN PATENT DOCUMENTS

| | | |
|---|---|---|
| JP | 2000-132347 A | 5/2000 |
| JP | 2001-306273 A | 11/2001 |
| JP | 2004-287727 A | 10/2004 |

OTHER PUBLICATIONS

Office Action issued Feb. 3, 2012 for corresponding JP2007-306301.

* cited by examiner

*Primary Examiner* — Negussie Worku
(74) *Attorney, Agent, or Firm* — Rossi, Kimms & McDowell LLP

(57) ABSTRACT

An information processing apparatus receives first print setting information of a document file to be printed from a printing apparatus via a network, and analyzes it. Based on the analysis result, the information processing apparatus generates divided document files by dividing the document file into data each to be output on one print sheet. The information processing apparatus generates second print setting information by rewriting the first print setting information so as to obtain the same print results of the divided document files as those of the document file before division. The information processing apparatus encrypts each generated divided document file to generate an encrypted divided document file. The information processing apparatus transmits the encrypted divided document file and second print setting information to the printing apparatus via the network.

18 Claims, 18 Drawing Sheets

FIG. 3

| DOCUMENT INFORMATION |
| --- |
| DOCUMENT ID ~1501 |
| DOCUMENT NAME ~1502 |
| REGISTRATION USER ID ~1503 |
| JOB TICKET ~1504 |
| DOCUMENT FILE REFERENCE INFORMATION ~1505 |
| ENCRYPTION PASSWORD ~1506 |

FIG. 4

| USER INFORMATION |
| --- |
| USER ID ~1601 |
| LOG-IN ID ~1602 |
| LOG-IN PASSWORD ~1603 |

FIG. 5

```
1  <JobTicket>
2     <Process=Print>
3        <Type="DOCUMENT TO BE PRINTED">
4             <Document="Original.doc" />
5        </Type>
6        <Type="PAGE TO BE PRINTED">
7             <PrintPage="1-8" />
8        </Type>
9        <Type="PAPER SIZE">
10            <Size="A4" />
11       </Type>
12       <Type="PRINT METHOD">
13            <PrintMethod="BOOKBINDING" />
14       </Type>
15       <Type="COLOR MODE" />
16            <ColorMode="Color" />
17       </Type>
18    </Process>
19 </JobTicket>
```

FIG. 12

```
┌─────────────────────────────────────────────────────┐
│ LOG-IN                                              │
├─────────────────────────────────────────────────────┤
│                                                     │
│  SET USB KEY OR INPUT                               │
│  USER NAME AND PASSWORD                             │
│                                                     │
│                                                     │
│        USER NAME  [_____]~1101       │
│                                                     │
│                                                     │
│        PASSWORD   [_____]~1102       │
│                                                     │
│                                                     │
│                                                     │
│                         [ ← BACK ]  [ NEXT → ]      │
│                                                     │
└─────────────────────────────────────────────────────┘
```

F I G. 15

| CHANGE PRINT STYLE | | | |
|---|---|---|---|
| ■ PAPER SIZE | A4 | A3 | Letter |
| | B4 | B4 | |
| ■ PRINT SURFACE | SINGLE-SIDED | DOUBLE-SIDED | |
| ■ PAGE LAYOUT | 1Up | 2Up | 4Up |
| ■ COLOR | MONOCHROME | COLOR | |
| CANCEL | | | OK |

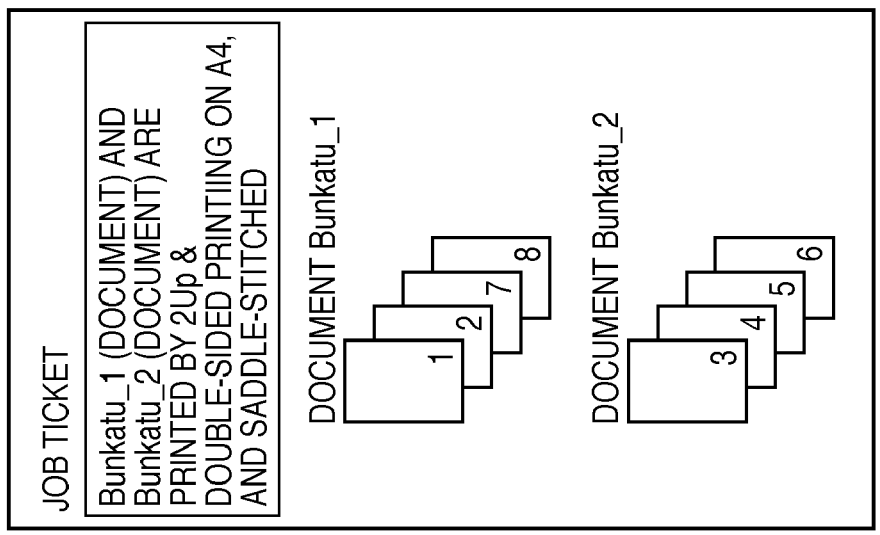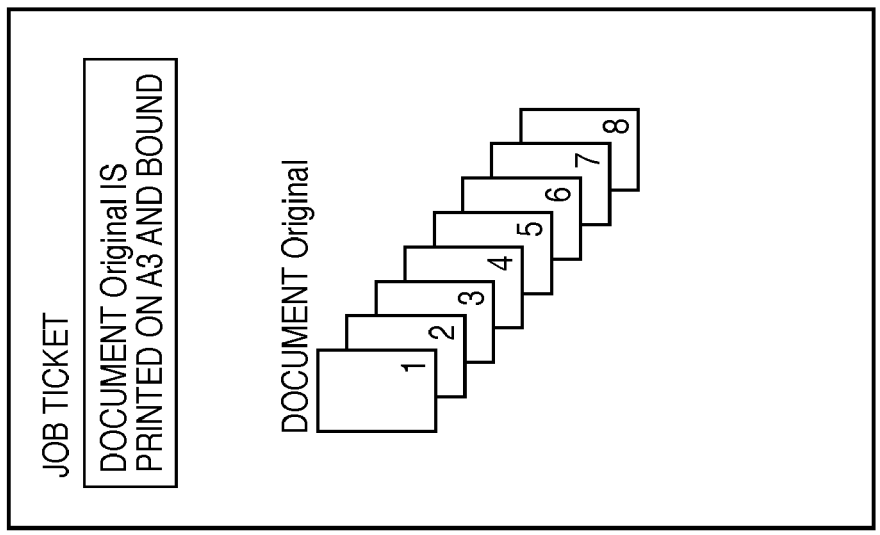
FIG. 18

FIG. 19

```
1  <JobTicket>
2      <Process=Print>
3          <Type="DOCUMENT TO BE PRINTED">
4              <Document="Bunkatsu_1.doc" />
5          </Type>
6          <Type="PAGE TO BE PRINTED">
7              <PrintPage="1-4" />
8          </Type>
9          <Type="PAPER SIZE">
10             <Size="A4" />
11         </Type>
12         <Type="PRINT METHOD">
13             <PrintMethod="DOUBLE-SIDED" />
14         </Type>
15         <Type="PAGE LAYOUT" />
16             <Layout="2Up" />
17         </Type>
18         <Type="COLOR MODE" />
19             <ColorMode="Color" />
20         </Type>
21     </Process>
22     <Process=Print>
23         <Type="DOCUMENT TO BE PRINTED">
24             <Document="Bunkatsu_2.doc" />
25         </Type>
26         <Type="PAGE TO BE PRINTED">
27             <PrintPage="4-8" />
28         </Type>
29         <Type="PAPER SIZE">
30             <Size="A4" />
31         </Type>
32         <Type="PRINT METHOD">
33             <PrintMethod="DOUBLE-SIDED" />
34         </Type>
35         <Type="PAGE LAYOUT" />
36             <Layout="2Up" />
37         </Type>
38         <Type="COLOR MODE" />
39             <ColorMode="Color" />
40         </Type>
41     </Process>
42     <Process=Staple>
43         <Type="Method">
44             <Method="SADDLE STITCH" />
45         </Type>
46     </Process>
47 </JobTicket>
```

INFORMATION PROCESSING APPARATUS, PRINTING APPARATUS, CONTROL METHOD THEREFOR, INFORMATION PROCESSING SYSTEM, AND PROGRAM

BACKGROUND OF THE INVENTION

1. Field of the Invention

The present invention relates to an information processing apparatus which manages document files, a printing apparatus which acquires a document file to be printed and prints it, a control method therefor, an information processing system having these apparatuses, and a program.

2. Description of the Related Art

A printing system which executes printing by transmitting data via a network from an information processing apparatus such as a personal computer to an image output apparatus (to be simply referred to as a printer hereinafter) such as a page printer or MFP (Multi Function Peripheral) has conventionally been popular.

Generally in the printing system, when the number of queued print jobs or the processing amount (e.g., the number of output copies) is large in printing, a print job is temporarily stored (accumulated) in a nonvolatile memory such as a hard disk drive (HDD) in the printer, and then output.

In the printing system, if the HDD of the printer is stolen or the printer is illicitly accessed, it becomes difficult to ensure the security of a print job stored in the HDD.

To solve this problem, there is a technique of encrypting all print jobs to be saved in an HDD, then accumulating them, and at the start of actual printing, decrypting them in a nonvolatile memory (to be referred to as a RAM hereinafter) and printing (Japanese Patent Laid-Open No. 2001-306273). According to Japanese Patent Laid-Open No. 2001-306273, security can be maintained even when the printer stops for a long time owing to a trouble such as a paper jam or the absence of toner.

There is also proposed a technique of ensuring the security of a network which connects a personal computer and printer. More specifically, the personal computer encrypts a print job (encrypts not the communication channel but the print job itself), and then transmits it to the printer. The printer decrypts the received encrypted print job (the user inputs a password via a user interface), and prints. This printing method will be called encrypted printing.

In general, however, most PDL files (e.g., a PostScript file) and electronic document files cannot be encrypted for each page according to the specifications. In printing, not each print page but an entire electronic document file or PDL needs to be decrypted. To execute encrypted printing of an electronic document file or PDL while maintaining security according to the conventional technique, data corresponding to the entire electronic document file or PDL needs to be decrypted in the RAM. The printer requires a large-capacity RAM.

In practice, no large-capacity RAM can be mounted in the printer. Thus, if such a print job is input, the printer cannot process it, resulting in an error. To avoid this, such a print job needs to be temporarily saved in not the RAM but HDD of the printer.

In this case, no electronic document or PDL can be deleted from the HDD of the printer till the end of processing a print job, and decrypted print data remains saved in the HDD. If the printer stops owing to a trouble such as a jam, the decrypted print data is left in the HDD of the printer, failing to ensure the security of the print data.

That is, encrypted printing according to the conventional technique cannot achieve both execution of a print job and ensuring of security.

SUMMARY OF THE INVENTION

The present invention has been made to overcome the conventional drawbacks, and has as its object to provide an information processing apparatus, printing apparatus, control method therefor, and program capable of providing a printing environment where both execution of a print job and ensuring of security are preferably achieved.

According to the first aspect of the present invention, an information processing apparatus which manages document files to be output to a printing apparatus via a network, the information processing apparatus comprises: a management unit adapted to manage the document files by registering the document files in a storage medium; a reception unit adapted to receive, from the printing apparatus via the network, first print setting information of a document file to be printed out of the document files managed by the management unit; an analysis unit adapted to analyze the first print setting information; a division unit adapted to divide, based on an analysis result of the analysis unit, the document file into data each to be output on one print sheet to generate divided document files; a rewriting unit adapted to rewrite the first print setting information to generate second print setting information so as to obtain the same print results of the divided document files as print results of the document file before division; an encryption unit adapted to encrypt each divided document file generated by the division unit to generate an encrypted divided document file; and a transmission unit adapted to transmit, to the printing apparatus via the network, the encrypted divided document file generated by the encryption unit and the second print setting information generated by the rewriting unit.

In a preferred embodiment, when a password is set for a document file to be registered, the document file is encrypted based on the password, and the management unit manages the document file by registering the document file in the storage medium.

In a preferred embodiment, the apparatus further comprises: an acquisition unit adapted to, when the document file to be printed has been encrypted, acquire from the printing apparatus, a password for decrypting the document file; and a decryption unit adapted to decrypt the document file by using the password acquired by the acquisition unit, wherein the encryption unit encrypts, by using the same password as the password acquired by the acquisition unit, the divided document file generated by the division unit to generate an encrypted divided document file.

According to the second aspect of the present invention, a printing apparatus which acquires a document file to be printed from an information processing apparatus for managing document files, and prints the document file, the printing apparatus comprises: a transmission unit adapted to transmit, to the information processing apparatus via a network, first print setting information of a document file to be printed; a reception unit adapted to receive, from the information processing apparatus via the network, encrypted divided document files generated by the information processing apparatus by dividing, based on the first print setting information, the document file into data each to be output on one print sheet, and encrypting the divided document files, and second print setting information generated by rewriting the first print setting information so as to obtain the same print results of the divided document files as print results of the document file before division; a decryption unit adapted to decrypt each encrypted divided document file received by the reception unit to generate a divided document file; and a printing unit adapted to print, based on the second print setting information, the divided document file generated by the decryption unit.

In a preferred embodiment, the apparatus further comprises a storage unit adapted to store the encrypted divided document file received by the reception unit in a nonvolatile memory, wherein the decryption unit acquires an encrypted divided document file to be processed from a plurality of encrypted divided document files stored in the storage unit, and decrypts the encrypted divided document file in a volatile memory to generate a divided document file, and the printing unit prints the divided document file generated by the decryption unit on the basis of the second print setting information.

In a preferred embodiment, the apparatus further comprises a deletion unit adapted to delete, respectively from the volatile memory and the nonvolatile memory, a divided document file and an encrypted divided document file which correspond to a divided document file printed by the printing unit.

According to the third aspect of the present invention, an information processing system comprising an information processing apparatus which manages document files, and a printing apparatus which acquires a document file to be printed and prints the document file, the information processing apparatus comprises: a management unit adapted to manage the document files by registering the document files in a storage medium; a first reception unit adapted to receive, from the printing apparatus via a network, first print setting information of a document file to be printed out of the document files managed by the management unit; an analysis unit adapted to analyze the first print setting information; a division unit adapted to divide, based on an analysis result of the analysis unit, the document file into data each to be output on one print sheet to generate divided document files; a rewriting unit adapted to rewrite the first print setting information to generate second print setting information so as to obtain the same print results of the divided document files as print results of the document file before division; an encryption unit adapted to encrypt each divided document file generated by the division unit to generate an encrypted divided document file; and a first transmission unit adapted to transmit, to the printing apparatus, the encrypted divided document file generated by the encryption unit and the second print setting information generated by the rewriting unit, and the printing apparatus comprises: a second transmission unit adapted to transmit the first print setting information to the information processing apparatus via the network; a second reception unit adapted to receive, from the information processing apparatus, the encrypted divided document file and the second print setting information corresponding to the encrypted divided document file; a decryption unit adapted to decrypt the encrypted divided document file received by the second reception unit to generate a divided document file; and a printing unit adapted to print, based on the second print setting information, the divided document file generated by the decryption unit.

According to the fourth aspect of the present invention, a method of controlling an information processing apparatus which manages document files to be output to a printing apparatus via a network, the method comprises: a management step of managing the document files by registering the document files in a storage medium; a reception step of receiving, from the printing apparatus via the network, first print setting information of a document file to be printed out of the document files managed in the storage medium; an analysis step of analyzing the first print setting information; a division step of dividing, based on an analysis result of the analysis step, the document file into data each to be output on one print sheet to generate divided document files; a rewriting step of rewriting the first print setting information to generate second print setting information so as to obtain the same print results of the divided document files as print results of the document file before division; an encryption step of encrypting each divided document file generated in the division step to generate an encrypted divided document file; and a transmission step of transmitting, to the printing apparatus via the network, the encrypted divided document file generated in the encryption step and the second print setting information generated in the rewriting step.

According to the fifth aspect of the present invention, a method of controlling a printing apparatus which acquires a document file to be printed from an information processing apparatus for managing document files, and prints the document file, the method comprises: a transmission step of transmitting, from the information processing apparatus via a network, first print setting information of a document file to be printed; a reception step of receiving, from the information processing apparatus via the network, encrypted divided document files generated by the information processing apparatus by dividing, based on the first print setting information, the document file into data each to be output on one print sheet, and encrypting the divided document files, and second print setting information generated by rewriting the first print setting information so as to obtain the same print results of the divided document files as print results of the document file before division; a decryption step of decrypting each encrypted divided document file received in the reception step to generate a divided document file; and a printing step of printing, based on the second print setting information, the divided document file generated in the decryption step.

According to the sixth aspect of the present invention, a program stored in a computer-readable medium to cause a computer to control an information processing apparatus which manages document files to be output to a printing apparatus via a network, the program causes the computer to execute a management step of managing the document files by registering the document files in a storage medium, a reception step of receiving, from the printing apparatus via the network, first print setting information of a document file to be printed out of the document files managed in the storage medium, an analysis step of analyzing the first print setting information, a division step of dividing, based on an analysis result of the analysis step, the document file into data each to be output on one print sheet to generate divided document files, a rewriting step of rewriting the first print setting information to generate second print setting information so as to obtain the same print results of the divided document files as print results of the document file before division, an encryption step of encrypting each divided document file generated in the division step to generate an encrypted divided document file, and a transmission step of transmitting, to the printing apparatus via the network, the encrypted divided document file generated in the encryption step and the second print setting information generated in the rewriting step.

According to the seventh aspect of the present invention, a program stored in a computer-readable medium to cause a computer to control a printing apparatus which acquires a document file to be printed from an information processing apparatus for managing document files, and prints the document file, the program causes the computer to execute a transmission step of transmitting, to the information processing apparatus via a network, first print setting information of a document file to be printed, a reception step of receiving, from the information processing apparatus via the network, encrypted divided document files generated by the information processing apparatus by dividing, based on the first print setting information, the document file into data each to be output on one print sheet, and encrypting the divided document files, and second print setting information generated by rewriting the first print setting information so as to obtain the same print results of the divided document files as print results of the document file before division, a decryption step of decrypting each encrypted divided document file received in the reception step to generate a divided document file, and a printing step of printing, based on the second print setting information, the divided document file generated in the decryption step.

According to the eight aspect of the present invention, an information processing system comprising an information processing apparatus which manages document files, and a printing apparatus which acquires a document file to be printed and prints the document file, the information processing apparatus comprises: a division unit adapted to divide the document file into data each to be output on one print sheet or into pages of the document file to generate divided document files; an encryption unit adapted to encrypt each divided document file generated by the division unit to generate an encrypted divided document file; and a transmission unit adapted to transmit, to the printing apparatus, the encrypted divided document file generated by the encryption unit, and the printing apparatus comprises: a reception unit adapted to receive the encrypted divided document file from the information processing apparatus; a decryption unit adapted to decrypt, in a volatile memory, the encrypted divided document file received by the reception unit to generate a divided document file; and a printing unit adapted to print the divided document file generated by the decryption unit.

According to the ninth aspect of the present invention, an information processing apparatus which manages document files to be output to a printing apparatus via a network, the information processing apparatus comprises: a division unit adapted to divide the document file into data each to be output on one print sheet or into pages of the document file to generate divided document files; an encryption unit adapted to encrypt each divided document file generated by the division unit to generate an encrypted divided document file; and a transmission unit adapted to transmit, to the printing apparatus, the encrypted divided document file generated by the encryption unit.

According to the tenth aspect of the present invention, a printing apparatus which acquires a document file to be printed from an information processing apparatus for managing document files, and prints the document file, the printing apparatus comprises: a reception unit adapted to receive, from the information processing apparatus, encrypted divided document files generated by the information processing apparatus by dividing the document file into data each to be output on one print sheet or into pages of the document file; a decryption unit adapted to decrypt, in a volatile memory, each encrypted divided document file received by the reception unit to generate a divided document file; and a printing unit adapted to print the divided document file generated by the decryption unit.

According to the eleventh aspect of the present invention, a method of controlling an information processing apparatus which manages document files to be output to a printing apparatus via a network, the method comprises: a division step of dividing the document file into data each to be output on one print sheet or into pages of the document file to generate divided document files; an encryption step of encrypting each divided document file generated in the division step to generate an encrypted divided document file; and a transmission step of transmitting, to the printing apparatus, the encrypted divided document file generated in the encryption step.

According to twelfth aspect of the present invention, a method of controlling a printing apparatus which acquires a document file to be printed from an information processing apparatus for managing document files, and prints the document file, the method comprises: a reception step of receiving, from the information processing apparatus, encrypted divided document files generated by the information processing apparatus by dividing the document file into data each to be output on one print sheet or into pages of the document file; a decryption step of decrypting, in a volatile memory, each encrypted divided document file received in the reception step to generate a divided document file; and a printing step of printing the divided document file generated in the decryption step.

According to the thirteenth aspect of the present invention, a program stored in a computer-readable medium to cause a computer to control an information processing apparatus which manages document files to be output to a printing apparatus via a network, the program causes the computer to execute a division step of dividing the document file into data each to be output on one print sheet or into pages of the document file to generate divided document files, an encryption step of encrypting each divided document file generated in the division step to generate an encrypted divided document file, and a transmission step of transmitting, to the printing apparatus, the encrypted divided document file generated in the encryption step.

According to fourteenth aspect of the present invention, a program stored in a computer-readable medium to cause a computer to control a printing apparatus which acquires a document file to be printed from an information processing apparatus for managing document files, and prints the document file, the program causes the computer to execute a reception step of receiving, from the information processing apparatus, encrypted divided document files generated by the information processing apparatus by dividing the document file into data each to be output on one print sheet or into pages of the document file, a decryption step of decrypting, in a volatile memory, each encrypted divided document file received in the reception step to generate a divided document file, and a printing step of printing the divided document file generated in the decryption step.

Further features of the present invention will be apparent from the following description of exemplary embodiments with reference to the attached drawings.

BRIEF DESCRIPTION OF THE DRAWINGS

FIG. 3 is a view showing the format of a data file for storing document information created and managed by a document information registration unit according to the embodiment of the present invention;

FIG. 4 is a view showing the format of a data file for storing user information created and managed by a user management unit according to the embodiment of the present invention;

FIG. 5 is a view showing an example of a job ticket according to the embodiment of the present invention;

FIG. 12 is a view showing an example of a log-in window according to the embodiment of the present invention;

FIG. 15 is a view showing an example of a print style setup window according to the embodiment of the present invention;

FIG. 18 is a conceptual view showing an example of a document file to be printed, a job ticket, a divided document file, and a job ticket rewritten upon the division according to the embodiment of the present invention; and FIG. 19 is a view showing a job ticket rewritten upon generating a divided document file according to the embodiment of the present invention.

DESCRIPTION OF THE EMBODIMENT

A preferred embodiment of the present invention will now be described in detail with reference to the drawings. It should be noted that the relative arrangement of the components, the numerical expressions and numerical values set forth in the embodiment do not limit the scope of the present invention unless it is specifically stated otherwise.

Figure 1:
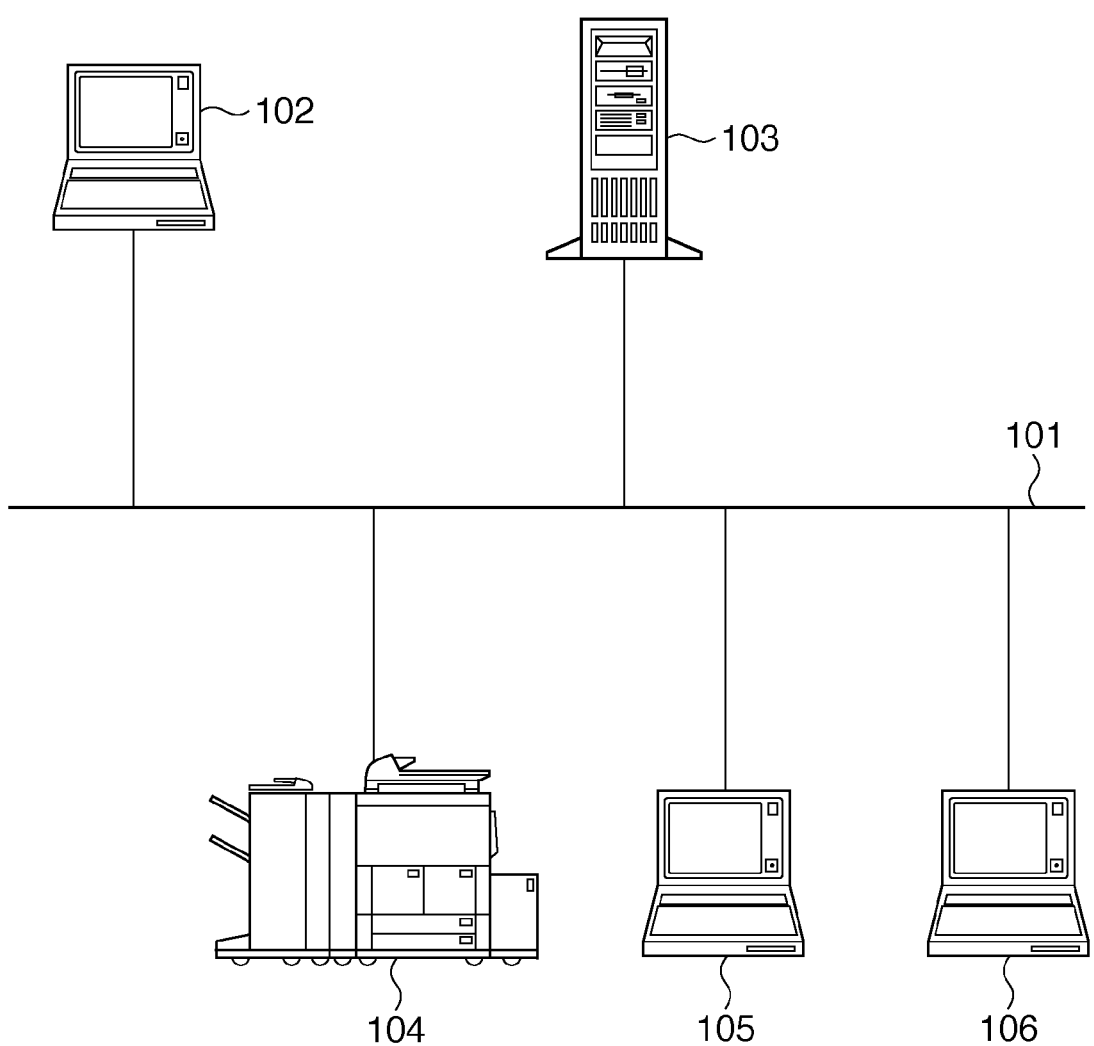
FIG. 1 is a block diagram showing the configuration of an information processing system according to an embodiment to which the present invention is applicable.

FIG. 1 is a block diagram showing the configuration of an information processing system according to an embodiment to which the present invention is applicable.

Assume that at least one document registration client 102, one printing apparatus 104, and management client 105 are connected in the information processing system.

In FIG. 1, the document registration client 102, a document provision system server 103, and the management client 105 are information processing apparatuses, and can execute various programs such as an application program. The printing apparatus 104 also has an information processing apparatus, and can execute various programs such as an application program.

The document registration client 102, document provision system server 103, printing apparatus 104, and management client 105 are connected to a network 101 (e.g., a LAN, WAN, or Internet) via a cable, and can communicate with each other.

The printing apparatus 104 is an MFP as an example of an image output apparatus. The printing apparatus 104 receives an electronic document, print data of PDL codes, and print setting information (job ticket) designating the print style such as bookbinding from an information processing apparatus via the network 101, and stores them in a predetermined memory (storage medium). At the same time, the printing apparatus 104 creates a character pattern, print image, or the like in accordance with the print data and the like, and forms an image on a print sheet.

The print data contains print information including a character code, image, and control code.

When the printing apparatus 104 does not have an information processing function capable of executing various programs such as an application program, a print control computer 106 having the information processing function may also be arranged separately from the printing apparatus 104. In this case, the print control computer 106 accepts a document print instruction from the user, communicates with the document provision system server 103, and controls the printing apparatus 104. In the following description, the printing apparatus 104 means both a printing apparatus having the information processing function, and an arrangement made up of a printing apparatus and print control computer.

Figure 2:
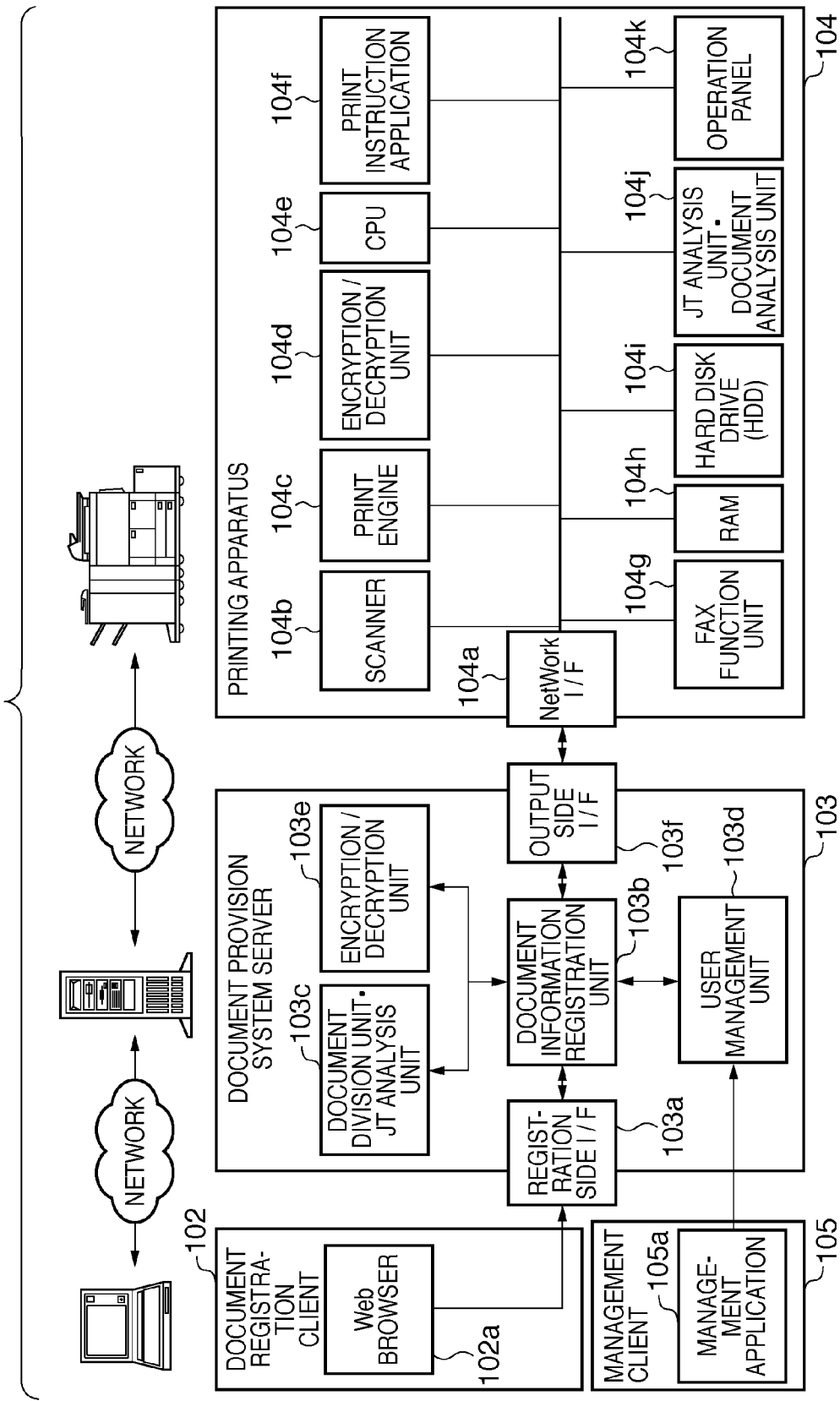
FIG. 2 is a view for explaining the module configuration of each terminal of the information processing system according to the embodiment of the present invention.

The document provision system server 103 is an application server which manages user information, document files, document information, and printing apparatus information. The document information is information on a document file, and contains, e.g., a user, document ID, and print setting information (job ticket). The document provision system server 103 can refer to the document information. The document provision system server 103 also has a function of dividing a document file of a plurality of pages into predetermined units (e.g., pages), and an application program which analyzes/rewrites print setting information (job ticket). Details of these functions will be explained with reference to a document division unit•JT analysis unit 103c (FIG. 2).

The document provision system server 103 can also have a Web server function. In this case, the document registration client 102 or management client 105 can use a Web browser to access various types of information managed by the document provision system server 103. Alternatively, the document registration client 102, printing apparatus 104, and management client 105 may also be connected to the document provision system server 103 from a dedicated application (not limited to a Web browser) running in them by using a communication protocol. The communication protocol can be a general-purpose communication protocol such as TCP/IP or HTTP, but is not limited to them.

A user who is to register a document to be printed performs a registration operation in the document provision system server 103 by designating print settings and a document file from the document registration client 102 via a Web browser/application. The print settings are generally called a print instruction (or job ticket), which means a document that describes a print method such as double-sided printing or bookbinding printing.

A user who is to print a document (the user may also be one who registers a document) refers to and downloads document information, a document file, and a job ticket from the document provision system server 103 via an operation panel in the printing apparatus 104, and executes an operation such as printing. An administrator who manages users performs a user management operation in the management client 105 via a Web browser/application.

Various terminals (the document registration client 102, document provision system server 103, printing apparatus 104, management client 105, and print control computer 106) of the information processing system have standard building components mounted in a general-purpose computer. These building components include, e.g., a CPU, RAM, ROM, hard disk, external storage device, network interface, display, keyboard, and mouse.

The module configuration of each terminal of the information processing system will be explained with reference to FIG. 2.

FIG. 2 is a view for explaining the module configuration of each terminal of the information processing system according to the embodiment of the present invention.

A Web browser 102a runs in the document registration client 102.

A registration side I/F 103a interfaces the document provision system server 103 with the document registration client 102. The registration side I/F 103a has a Web server function and can accept a request by a protocol such as HTTP or HTTPS. A document information registration unit 103b pairs document information containing print setting information (job ticket) with a document file, and saves and manages the pair in association with a registration user identifier.

The document division unit•JT analysis unit 103c analyzes a job ticket (JT), and divides a document file into data each to be output on one sheet on the basis of the analysis result. Upon dividing a document file, the document division unit•JT analysis unit 103c rewrites the contents of the job ticket so as to obtain the same output results as those of the document file before division.

A user management unit 103d manages user information and printing apparatus information.

An output side I/F 103f interfaces the document provision system server 103 with the printing apparatus 104 (including the print control computer 106 which controls the printing apparatus 104). The output side I/F 103f has a Web server function and can accept a request by a protocol such as HTTP or HTTPS. The output side I/F 103f receives print setting information of a document file to be printed from the printing apparatus 104 (first reception). Further, the output side I/F 103f transmits an encrypted divided document file obtained by dividing the received document file and encrypting the divided file, and corresponding print setting information to the printing apparatus 104 (first transmission). An encryption/decryption unit 103e encrypts and decrypts a document file.

In the printing apparatus 104, a Network I/F 104a functions as a connection unit with the network 101. The Network I/F 104a transmits print setting information of a document file to be printed to the document provision system server 103 (second transmission). Further, the Network I/F 104a receives an encrypted divided document file obtained by dividing and encrypting a document file, and corresponding print setting information from the document provision system server 103 (second reception). A CPU 104e incorporates a ROM which stores the control programs of various processes to be executed by the printing apparatus 104. The CPU 104e executes the control programs to perform various control and calculation operations of the printing apparatus 104.

A hard disk drive (HDD) 104i is a nonvolatile memory (storage medium) which stores a print job. The HDD 104i also functions as an image memory. A RAM 104h is a volatile memory which temporarily stores a print job when outputting it. A scanner 104b scans an image from a document. A JT analysis unit-document analysis unit 104j analyzes an image scanned by the scanner 104b, and a print job (document file and job ticket) received from the Network I/F 104a.

A print engine 104c outputs, to a print sheet, print data based on a print job analyzed by the JT analysis unit-document analysis unit 104j. The printing method employed by the print engine 104c includes an inkjet method and laser beam method.

When a print job received via the Network I/F 104a has been encrypted, an encryption/decryption unit 104d decrypts the print job before an output process. A FAX function unit 104g has a function of FAX-transmitting image data scanned by the scanner 104b via a telephone line. The FAX function unit 104g also has a function of outputting, to the print engine 104c, image data received from another facsimile machine via a telephone line, and a function of storing image data in the HDD 104i.

An operation panel 104k is a user interface which allows the user to execute various operations such as display of a list of document information and document files, selection of a document file to be printed, and a print execution instruction.

A print instruction application 104f executes printing in accordance with a print instruction input from the operation panel 104k, and executes a management process for the processing status of a print job received from the Network I/F 104a.

Note that image data scanned and output from the scanner 104b, and image data received by the FAX function unit 104g are also examples of the print job. The print instruction application 104f also manages the processing statuses of these print jobs.

The Network I/F 104a of the printing apparatus 104 and the output side I/F 103f of the document provision system server 103 have a function of encrypting and decrypting communication so as not to allow easy eavesdropping of a print job during communication on the network 101. The communication encryption and decryption use, e.g., HTTPS, IPsec, PPTP, and L2TP.

The communication encryption and decryption are always executed separately from encryption and decryption performed by the encryption/decryption unit 103e of the document provision system server 103 and the encryption/decryption unit 104d of the printing apparatus 104. In the following description of this specification, "encryption" and "decryption" mean not the communication encryption and decryption, but encryption and decryption of a print job.

A management application 105a runs in the management client 105. The management application 105a communicates with the user management unit 103d to provide a user management function.

The format of a data file for storing document information created and managed by the document information registration unit 103b will be explained with reference to FIG. 3.

FIG. 3 is a view showing the format of a data file for storing document information created and managed by the document information registration unit according to the embodiment of the present invention.

As document information, a document name 1502, a registration user ID 1503 for identifying a user who has registered a document file, a job ticket 1504, and the like are managed in association with a document ID 1501 for identifying a document file. A document file is also managed in association with document information, but is managed separately from the document information. For this reason, the document information holds document file reference information 1505 for referring to the document file. However, the document file may also be held in document information.

When a password for encrypting a document file is set, document information holds an encryption password 1506.

The format of a data file for storing user information created and managed by the user management unit 103d will be explained with reference to FIG. 4.

FIG. 4 is a view showing the format of a data file for storing user information created and managed by the user management unit 103d according to the embodiment of the present invention.

User information is managed in association with a user ID 1601 for uniquely identifying a user, a log-in ID 1602 for logging in to the information processing system (e.g., the document provision system server 103), and a log-in password 1603.

An example of a job ticket will be explained with reference to FIG. 5.

FIG. 5 is a view showing an example of a job ticket according to the embodiment of the present invention.

In this example, the job ticket employs a text document format using a markup language typified by SGML or XML. Note that the expression of only a part necessary for the description of the embodiment is used, and the job ticket does not strictly comply with the specifications of SGML, XML, or the like.

The job ticket shown in FIG. 5 designates a print process to "print the first to eight pages of a document file Original.doc in color on A4 sheets and bind them".

The job ticket shown in FIG. 5 will be explained. The job ticket shown in FIG. 5 is made up of 19 lines, and uses tag expressions in a plurality of layers. A tag <JobTicket> on the first line means the start of the description of the job ticket. As a corresponding expression, a tag </JobTicket> on the 19th line means the end of the description of the job ticket.

The second to 18th lines represent concrete instructions. A tag <Process=Print> in the second layer on the second line describes the name of a process to be executed by the printing apparatus 104. As the process name, "Print" (print process) is described. The JT analysis unit-document analysis unit 104j controls the printing apparatus 104 to execute the process (tag in the second layer) in FIG. 5 sequentially from the top line, outputting a final product. In the example shown in FIG. 5, the printing apparatus 104 performs only the print process (second line).

Tags <Type . . . > in the third layer on the third to 17th lines describe the setting parameters of respective processes. For example, the third to fifth lines represent a "document to be printed". From this setting parameter, e.g., a document file name or document file ID, the print instruction application 104f specifies a document file to be printed.

The sixth to eighth lines represent a page to be printed. The ninth to 11th lines represent a paper size. The 12th to 14th lines represent a print method (bookbinding printing, single-sided printing, or double-sided printing). The 15th to 17th lines represent a color mode (color/monochrome).

A user management window for user management by the management client 105 will be explained.

Figure 6:
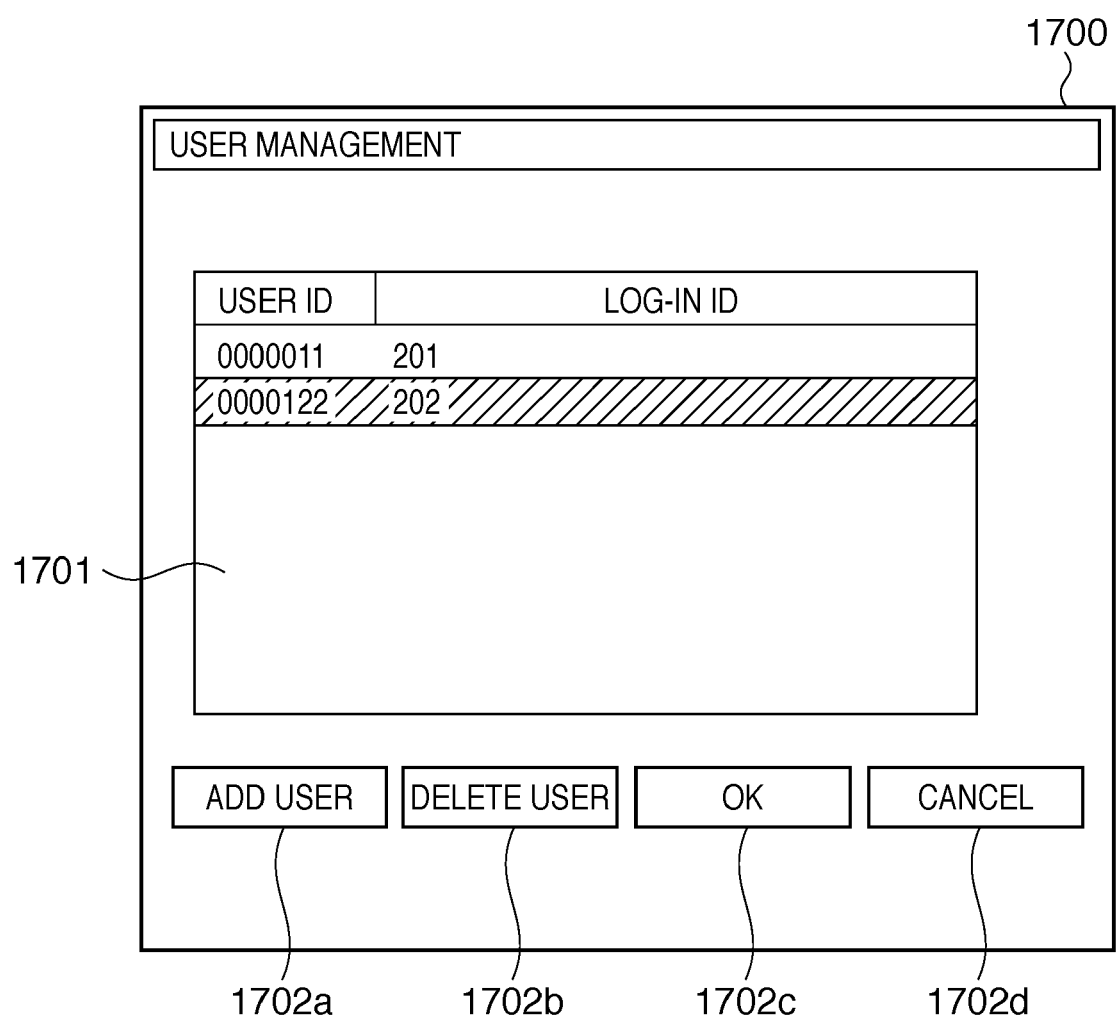
FIG. 6 is a view showing an example of a user management window according to the embodiment of the present invention.

FIG. 6 is a view showing an example of a user management window according to the embodiment of the present invention.

An administrative operator who performs user management uses a Web browser or the management application 105a running in the management client 105 to display a user management window 1700. The administrative operator operates the user management window 1700 to access the user management unit 103d.

In the user management window 1700, a user list 1701 shows a list of users currently registered in the user management unit 103d. When the administrative operator selects a user from the user list 1701, detailed information of the selected user appears below the user list 1701, and he can make various settings.

The user list 1701 shows the user ID 1601 and log-in ID 1602 of user information in FIG. 4. The administrative operator can press an Add User button 1702a to add a new user to the user list 1701. The administrative operator can press a Delete User button 1702b to delete a user selected in the user list 1701. The administrative operator presses an OK button 1702c to finalize the setting state of the user list 1701, and end the display of the user management window 1700. The administrative operator presses a Cancel button 1702d to cancel the setting state of the user list 1701 and end the display of the user management window 1700.

When adding a user in response to the Add User button 1702a, the user management unit 103d sets a log-in password 1603 for each user ID 1601, and manages it in association with the user ID 1601.

A document registration process to register a document file will be explained.

Figure 7:
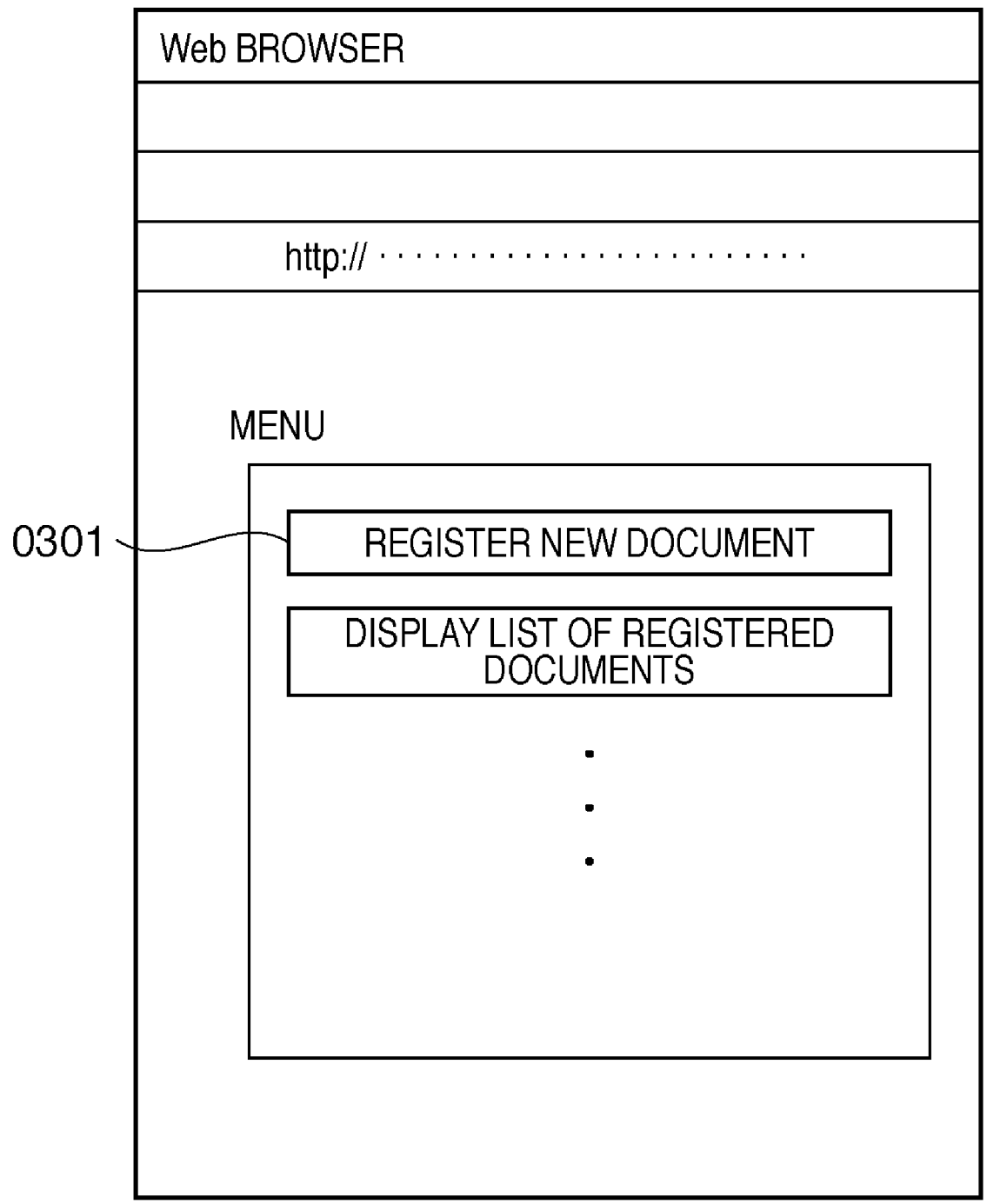
FIG. 7 is a view showing an example of a document registration window according to the embodiment of the present invention.

The user operates the Web browser 102a running in the document registration client 102 to access the registration side I/F 103a of the document provision system server 103 via the network 101. Then, the document provision system server 103 sends back a menu selection form serving as a document registration window to the document registration client 102. The Web browser 102a of the document registration client 102 displays the menu selection form (FIG. 7).

Figure 8:
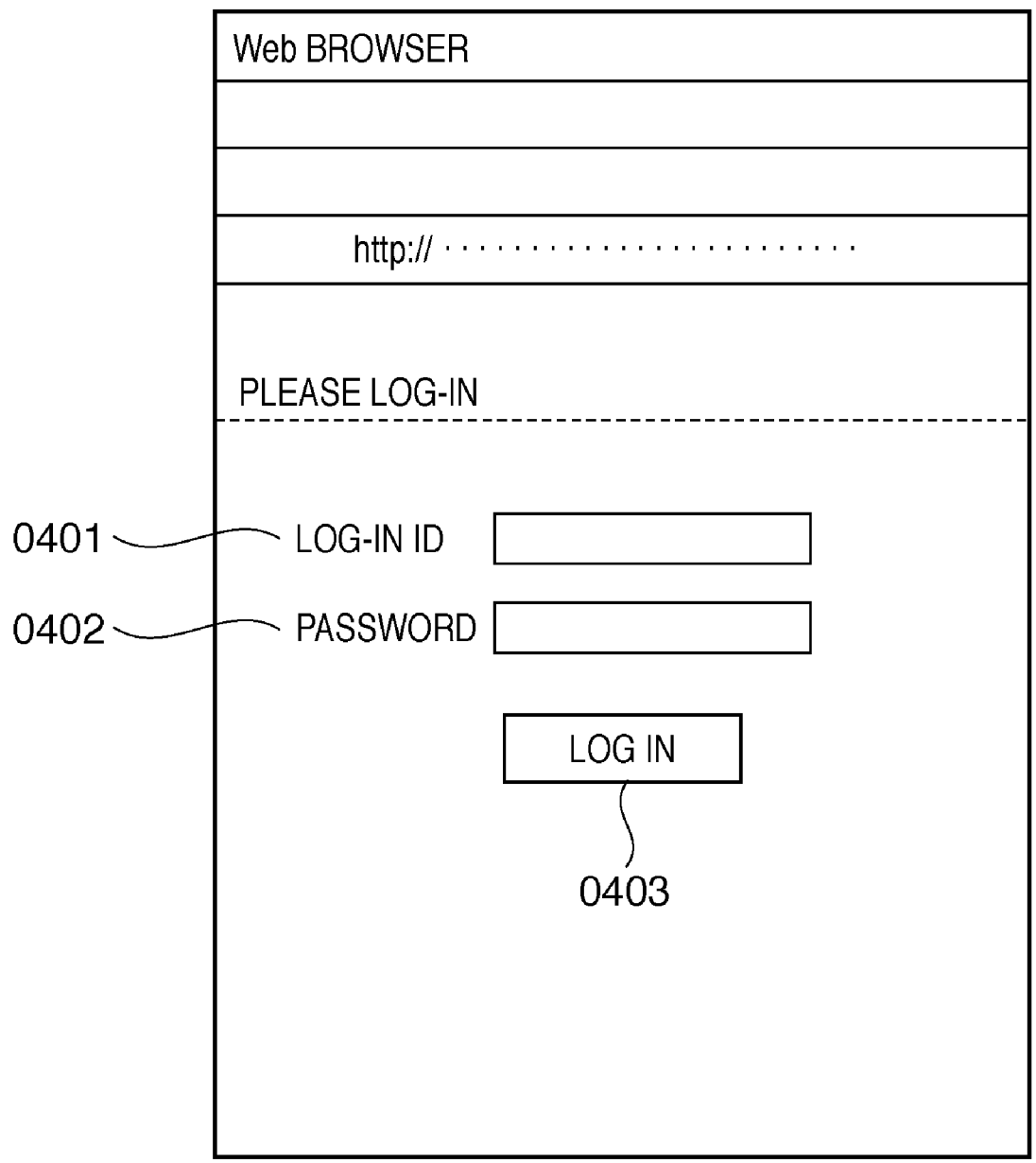
FIG. 8 is a view showing an example of a log-in window according to the embodiment of the present invention.

If the user selects a "register new document" menu 0301 in the menu selection form, the document registration client 102 sets menu selection information in the menu selection form, and transmits it to the registration side I/F 103a. Upon receiving the menu selection form, the document provision system server 103 sends back a log-in window form serving as a log-in window to the document registration client 102 via the registration side I/F 103a. The Web browser 102a of the document registration client 102 displays the log-in window form (FIG. 8).

In the log-in window form, the user inputs a log-in ID and password to a log-in ID designation field 0401 and password designation field 0402, respectively, and presses a "log in" button 0403. Then, the document registration client 102 sets the log-in information (log-in ID and password) in the log-in window form, and transmits it to the registration side I/F 103a. The user management unit 103d receives the log-in information via the registration side I/F 103a, executes a user authentication process, and sends back the authentication result to the registration side I/F 103a.

Figure 9:
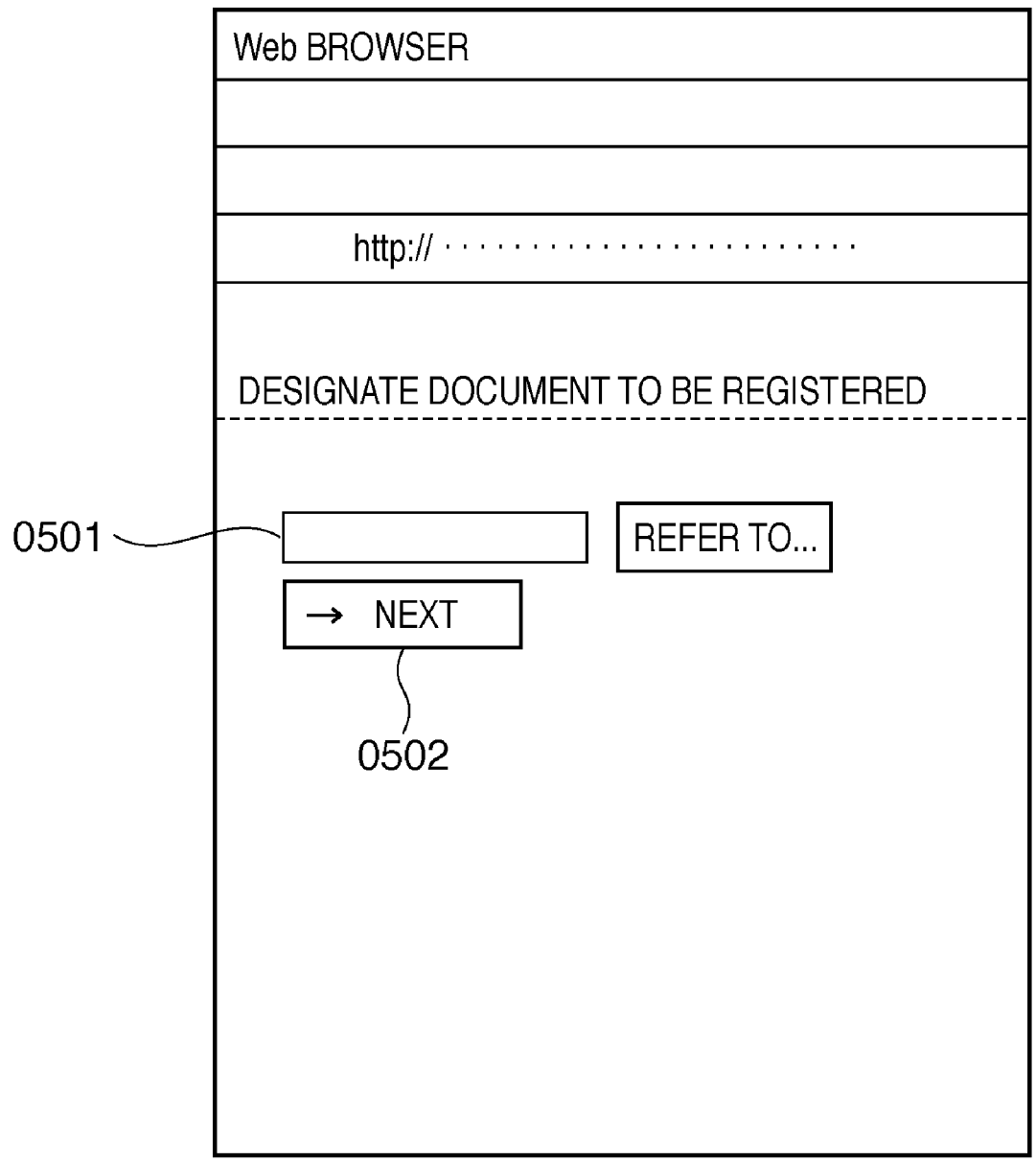
FIG. 9 is a view showing an example of a registration document designation window according to the embodiment of the present invention.

When the document provision system server 103 confirms that the user is one registered in the document provision system server 103, it sends a registration document designation form serving as a registration document designation window to the document registration client 102. The Web browser 102a of the document registration client 102 displays the registration document designation form (FIG. 9).

In the registration document designation form, the user designates the registration file name and path of a document file to be registered in a registered file designation field 0501 of the registration document designation form, and presses a "Next" button 0502. Then, the document registration client 102 transmits the designated document file, registration file name, and path to the registration side I/F 103*a*. The registration side I/F 103*a* transfers the received document file, registration file name, and path to the document information registration unit 103*b*. The document information registration unit 103*b* saves the document file in a registration destination designated by the path.

Figure 10:
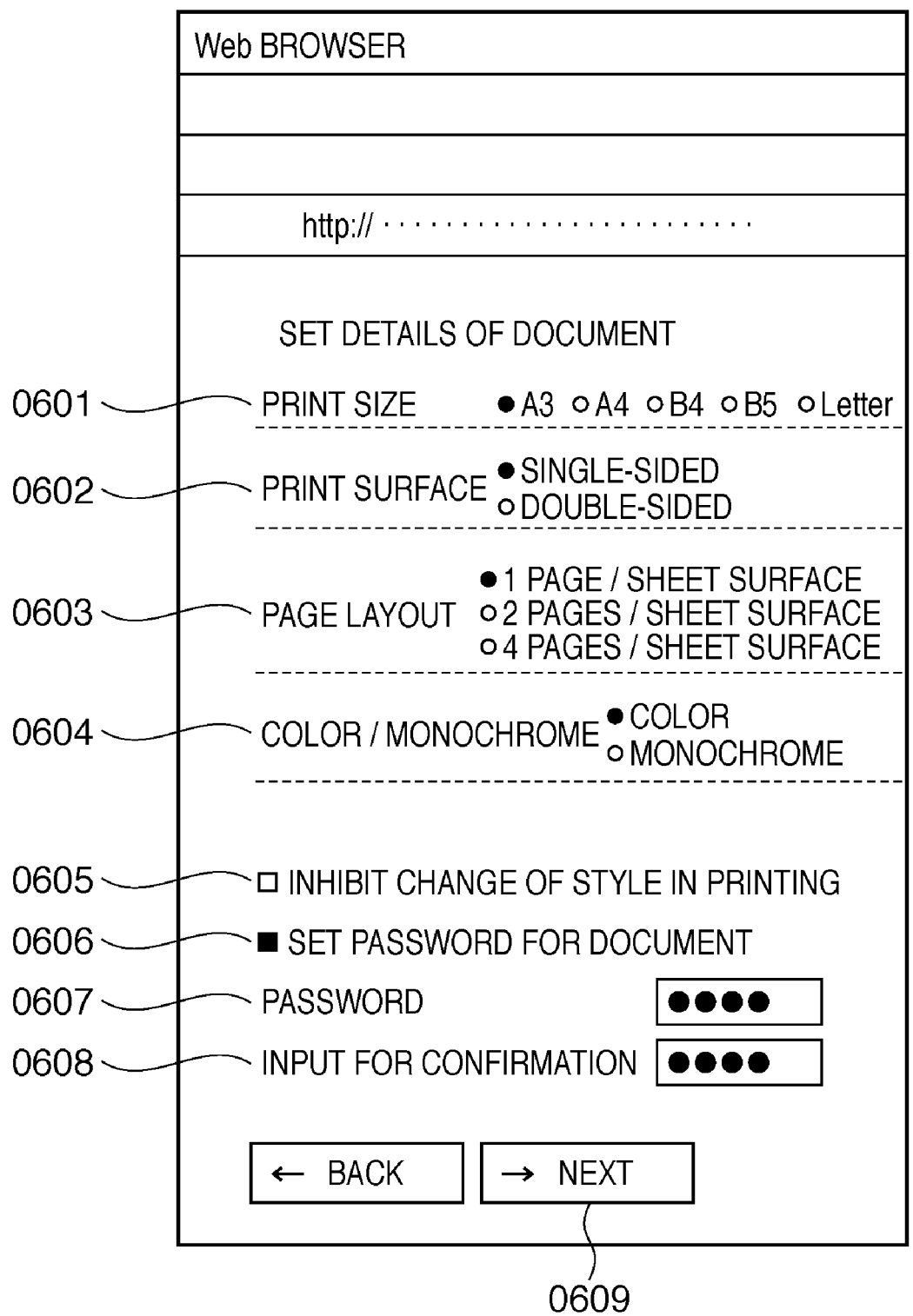
FIG. 10 is a view showing an example of a document attribute information designation window according to the embodiment of the present invention.

Subsequently, the document provision system server 103 sends back a document attribute information designation form serving as a document attribute information designation window to the document registration client 102 via the registration side I/F 103*a*. The Web browser 102*a* of the document registration client 102 displays the document attribute information designation form (FIG. 10).

In the document attribute information designation form, the user can designate various print settings such as a print size 0601, print surface (single/double-sided) 0602, page layout 0603, and color/monochrome 0604 as print settings in printing a document file.

With print style change permission/inhibition 0605 in printing, the user can also designate inhibition of designating the print style in printing and always printing with a print style registered in registration. The user can set a password for a document file in items 0606 to 0608. When the user sets a password for a document file, the document file is encrypted with this password and saved in the document provision system server 103. When the user designates printing by the printing apparatus 104, the password is requested of him, and only when he inputs the correct password, printing is permitted. In printing by the printing apparatus 104, the document file is decrypted with the password and printed. This arrangement can more securely protect a document file.

In the document attribute information designation form, the user designates various print settings and presses a "Next" button 0609. Then, the document registration client 102 sets the designated print settings in the document information designation form, and transmits them to the registration side I/F 103*a*. The registration side I/F 103*a* analyzes and extracts the received print settings, creates document information, and transfers it to the document information registration unit 103*b* together with the user ID of the user who has logged in.

Figure 11:
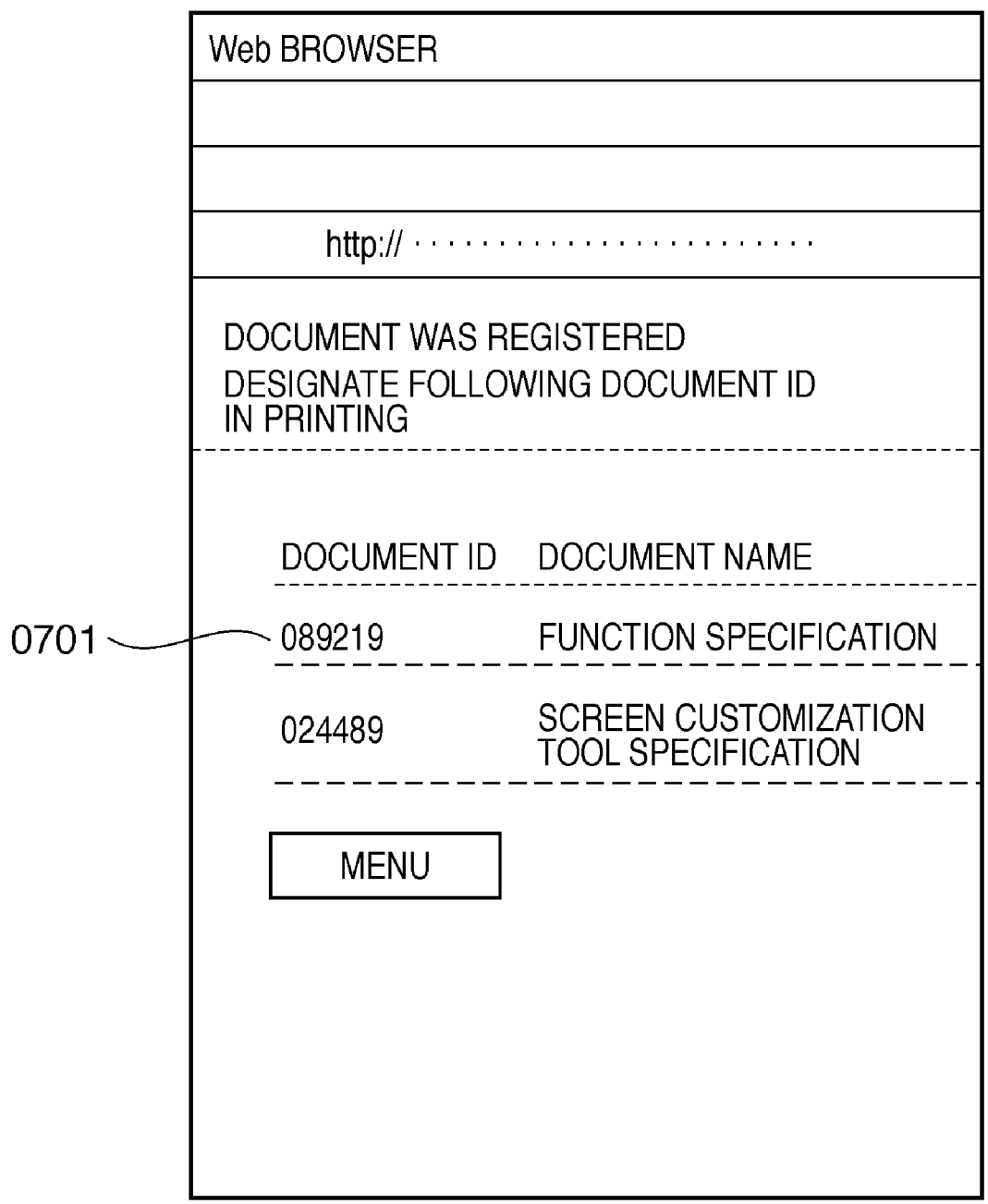
FIG. 11 is a view showing an example of a notification window according to the embodiment of the present invention.

The document information registration unit 103*b* saves the ID of the user who has registered a document file, document information, and the document file in association with each other. The document information registration unit 103*b* issues a document ID, and sends it back to the registration side I/F 103*a*. As a notification window, the registration side I/F 103*a* creates a document ID notification form including the document ID. The registration side I/F 103*a* sends back the document ID notification form to the document registration client 102. The Web browser 102*a* of the document registration client 102 displays the document ID notification form (FIG. 11). The user can print the document by using a document ID 0701 displayed in the document ID notification form.

A document print process to print a document file managed by the document provision system server 103 will be described.

The user operates the operation panel 104*k* of the printing apparatus 104 to issue a document print request via the print instruction application 104*f*. Then, the operation panel 104*k* displays a log-in window (FIG. 12). The user inputs a user ID (log-in ID) 1101 and password 1102. Then, the print instruction application 104*f* transmits the log-in ID and password to the output side I/F 103*f* of the document provision system server 103 via the Network I/F 104*a*.

The output side I/F 103*f* designates these pieces of information, and requests the document information registration unit 103*b* to acquire a document information list. The document information registration unit 103*b* issues an authentication process request to the user management unit 103*d*. The user management unit 103*d* searches for user information associated with the user ID, confirms that the user has been registered in the document provision system server 103, and verifies whether the password is authentic. If the password is authentic, the user management unit 103*d* notifies the printing apparatus 104 of a message to this effect. In response to this, the printing apparatus 104 permits log-in. If the password is not authentic, the user management unit 103*d* notifies the printing apparatus 104 of a message to this effect. In response to this, the printing apparatus 104 displays the log-in window (FIG. 12) again.

When the printing apparatus 104 permits log-in, the print instruction application 104*f* searches for a document file registered by the designated user, and creates a document information list. The print instruction application 104*f* sends back the created document information list to the output side I/F 103*f*. The output side I/F 103*f* sends back the document information list to the print instruction application 104*f*. Upon receiving the document information list, the printing apparatus 104 displays a document list window (FIG. 13) on the operation panel 104*k*.

The document list window will be described.

Figure 13:
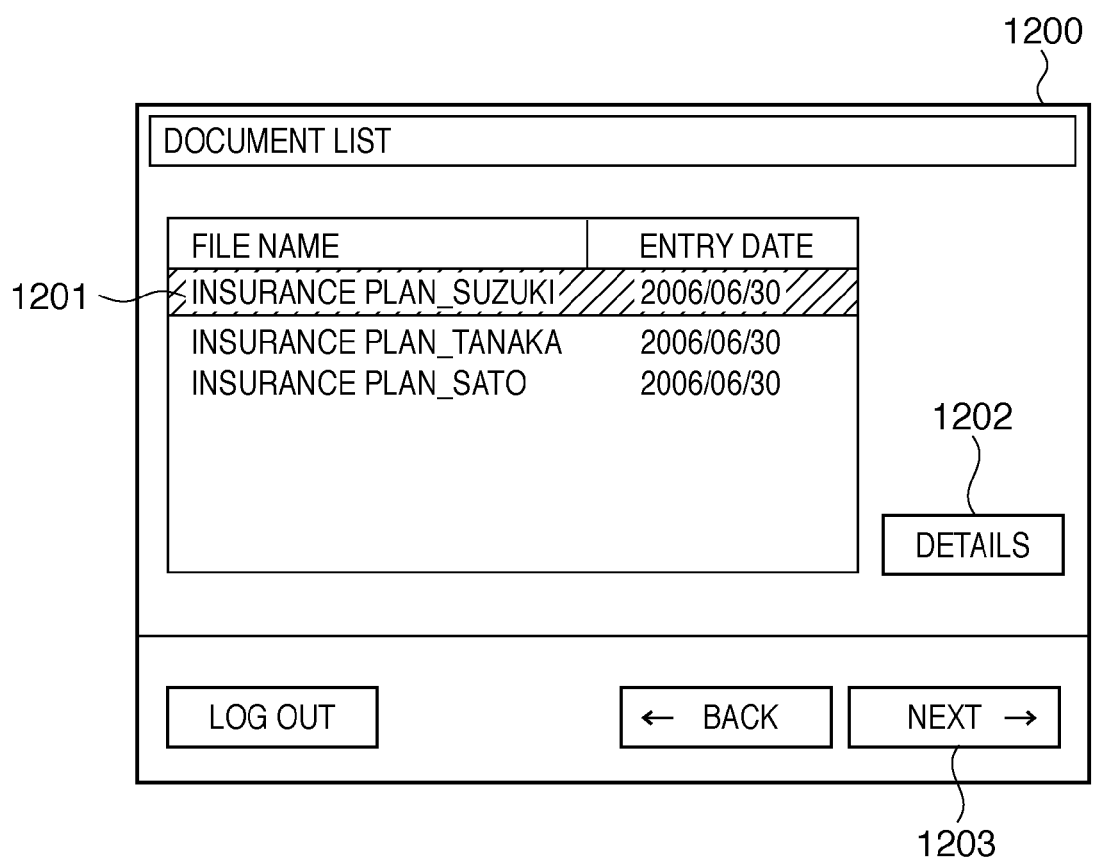
FIG. 13 is a view showing an example of a document list window according to the embodiment of the present invention.

FIG. 13 is a view showing an example of the document list window according to the embodiment of the present invention.

In a document list window 1200, a document list 1201 is a list of printable document files, and the user can select a document file to be printed. The user can press a Details button 1202 to display detailed information of a document file selected in the document list 1201. The user can press a "Next" button 1203 while selecting a document file to display a print instruction window (FIG. 14).

The print instruction window will be explained.

Figure 14:
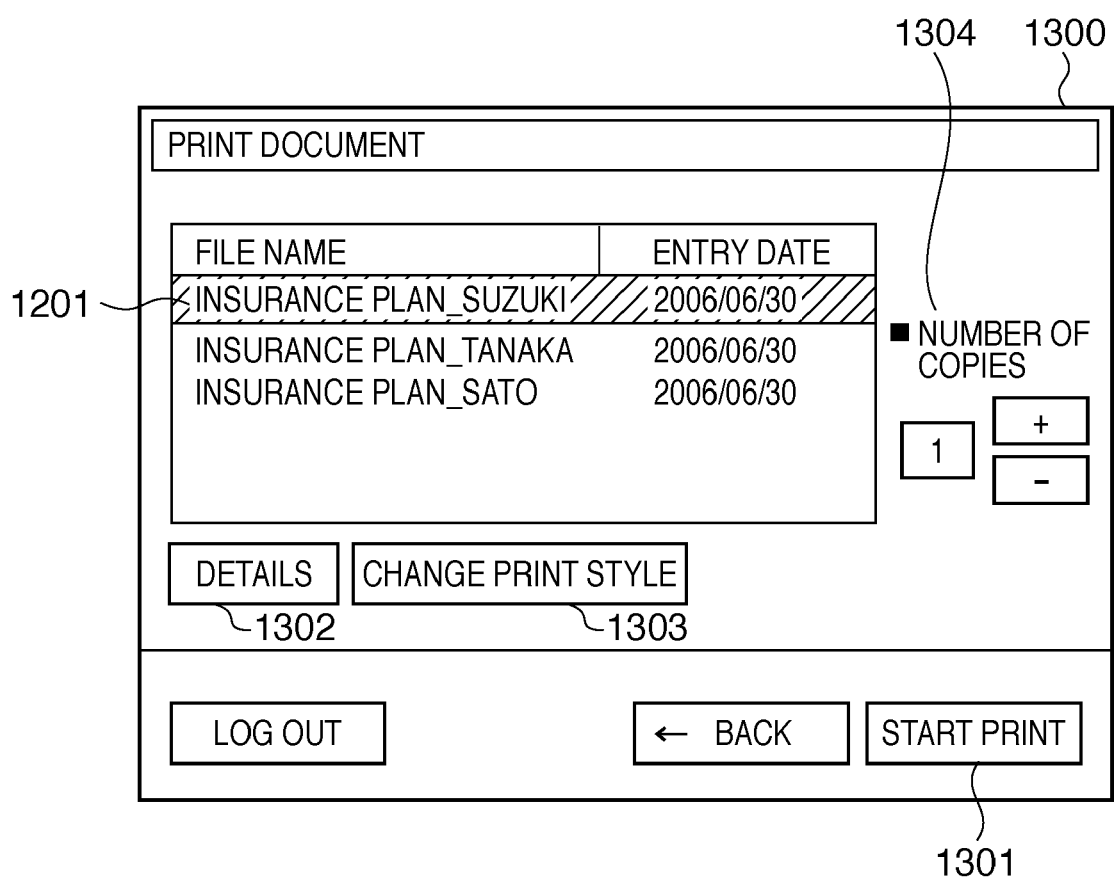
FIG. 14 is a view showing an example of a print instruction window according to the embodiment of the present invention.

FIG. 14 is a view showing an example of the print instruction window according to the embodiment of the present invention.

In a print instruction window 1300, the user can make various settings such as the print conditions of a document file to be printed. The user can press a Details button 1302 to display detailed information of a selected document file. The user can press a Change Print Style button 1303 to display a print style setup window (FIG. 15), and change the print style of the selected document file via the print style setup window. The print style includes the paper size, print surface, page layout, and color mode. The contents of the print style comply with the items of the document attribute information designation form.

In the print style setup window, the user can also change the print style from one set when registering a document. If the user changes the print style, the document information registration unit 103*b* needs to rewrite a job ticket contained in the associated document information, but a description thereof will be omitted.

In the print instruction window 1300, the user can press a Number of Copies button 1304 to designate the number of copies of a selected document. The user can press a "Start Print" button 1301 to execute the print process of a target document file.

More specifically, when the user presses the "Start Print" button 1301, the print instruction application 104*f* designates a document ID to the output side I/F 103*f*, and issues a document file acquisition request to the document provision system server 103. Upon receiving the request, the output side I/F 103*f* issues a document acquisition request to the document information registration unit 103*b*. The document information registration unit 103b searches for document information of a document file associated with the designated document ID, acquires a registration user ID from the document information, and transmits it to the user management unit 103d. The document information registration unit 103b compares the acquired registration user ID with the ID of the currently log-in user. If the user IDs coincide with each other as a result of the comparison, the printing apparatus 104 starts the print process of the detected document file.

A print process executed as a subsequent process between the printing apparatus 104 and the document provision system server 103 in cooperation with each other will be explained with reference to FIG. 16.

Figure 16:
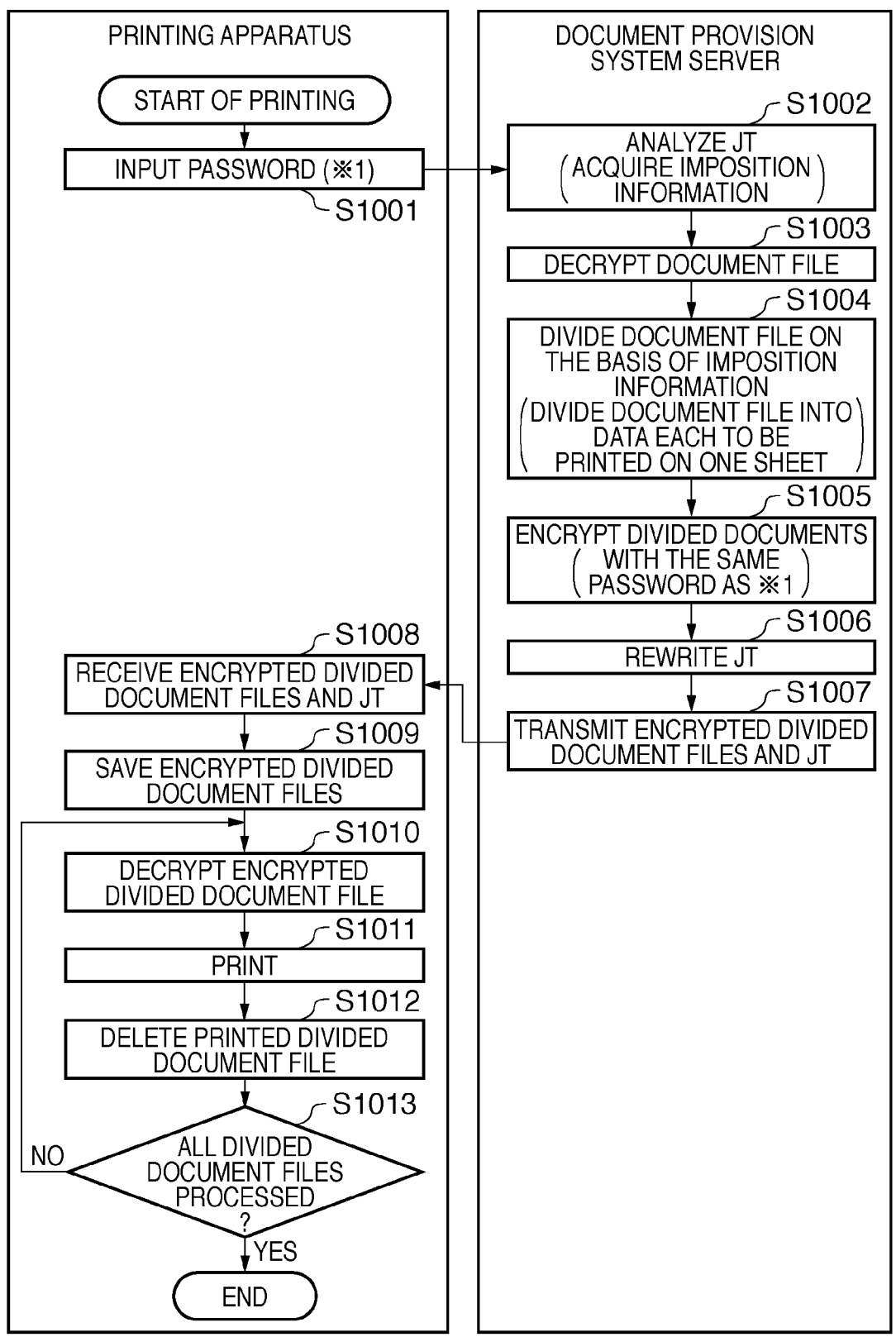
FIG. 16 is a flowchart showing a print process between a printing apparatus and a document provision system server according to the embodiment of the present invention.

FIG. 16 is a flowchart showing the print process between the printing apparatus and the document provision system server according to the embodiment of the present invention.

When the print process starts, the document division unit•JT analysis unit 103c checks whether a document file to be printed has been encrypted. If the document file to be printed has been encrypted, the document division unit•JT analysis unit 103c issues a password input request to the Network I/F 104a via the output side I/F 103f. In response to this request, the Network I/F 104a issues a password input request to the operation panel 104k. Then, the operation panel 104k displays a password input window to prompt the user to input a password.

The operation panel 104k receives a password on the basis of an operation to the password input window (step S1001). The operation panel 104k transmits the received password to the document provision system server 103 via the Network I/F 104a.

The document provision system server 103 receives the password via the output side I/F 103f. The encryption/decryption unit 103e verifies whether the received password is authentic. If the received password is authentic, the sequence shifts to the next process. If the received password is not authentic, the document provision system server 103 issues a password input request again to prompt the user to input a password to the operation panel 104k.

If the received password is authentic, the document division unit•JT analysis unit 103c analyzes a job ticket associated with the document file to be printed, and acquires imposition information (step S1002). When the job ticket shown in FIG. 5 is exemplified, the imposition information means information representing that the first to eighth pages of a document Original are printed in color on A4 sheets and bound.

The encryption/decryption unit 103e decrypts the document file to be printed on the basis of the received password (step S1003).

Based on the acquired imposition information, the document division unit•JT analysis unit 103c divides the document file into data each to be printed on one sheet, generating divided document files (step S1004).

Figure 17:
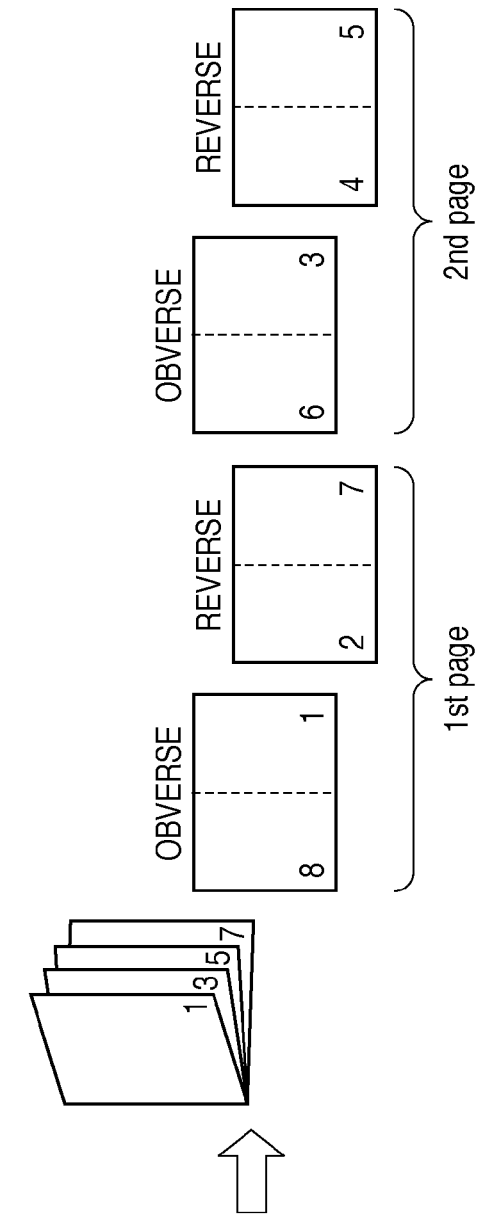
FIG. 17 is a conceptual view showing an example of a document file to be printed, a job ticket, and an output result using them according to the embodiment of the present invention.

When the job ticket shown in FIG. 5 and its document file (bookbinding printing) are exemplified, the eighth and first pages (obverse) and the second and seventh pages (reverse) in the document file are output on the first sheet as a print result, as shown in FIG. 17. Also, the sixth and third pages (obverse) and the fourth and fifth pages (reverse) in the document file are output on the second sheet. In the example shown in FIG. 5, the eight pages of the document Original are divided in step S1004 into a divided document Bunkatsu_1 including the eighth, first, second, and seventh pages and a divided document Bunkatsu_2 including the sixth, third, fourth, and fifth pages (FIG. 18). In step S1004, divided document files may also be generated by dividing the document file into pages.

The encryption/decryption unit 103e encrypts each divided document file again with the password used for encryption (step S1005), generating an encrypted divided document file.

The document division unit•JT analysis unit 103c rewrites the job ticket (step S1006). In the example shown in FIG. 5, the job ticket describing that the document Original is printed and bound is rewritten into a job ticket describing that "document Bunkatsu_1 and document Bunkatsu_2 are printed by double-sided & 2Up printing and finally saddle-stitched", as shown in FIG. 19.

The document information registration unit 103b transmits the encrypted divided document files and job ticket to the printing apparatus 104 via the output side I/F 103f (step S1007).

The print instruction application 104f controls the building components 104a to 104j of the printing apparatus 104 to execute a process to print the received encrypted divided document files according to the job ticket (steps S1008 to S1013).

More specifically, the print instruction application 104f receives the divided document files and job ticket from the document provision system server 103 via the Network I/F 104a (step S1008). The HDD 104i saves the received divided document files and job ticket (step S1009).

The JT analysis unit-document analysis unit 104j analyzes the job ticket, and acquires imposition information of the divided document file to be processed. If the divided document file has been encrypted, the encryption/decryption unit 104d decrypts it in the RAM 104h by using the password input in step S1001 (step S1010). The divided document file is divided into data each to be printed on one sheet or into pages, and thus can be decrypted in the RAM 104h having a relatively small storage capacity. That is, no divided file to be decrypted need be temporarily saved in the HDD 104i.

Based on the acquired imposition information, the divided document file is converted into a printer code interpretable by the print engine 104c, and printed on a print sheet (step S1011). Since a divided document file which has not been printed yet remains encrypted in the HDD 104i, the security of print data during printing can be ensured.

Printed divided document files are sequentially deleted from the volatile RAM 104h and HDD 104i (step S1012). The print instruction application 104f repeats the processes in steps S1010 and S1011 until all divided document files are printed (the process described in the job ticket ends) (step S1013).

The processes in steps S1010 and S1011 are executed in the volatile RAM 104h. In this case, even if the printing apparatus 104 stops for a long time owing to a trouble such as a jam, no decrypted print data exists in the HDD 104i, ensuring security.

As described above, according to the embodiment, divided document files are generated by dividing a document file to be printed into data each to be output on one sheet. Each divided document file is encrypted and transmitted to the printing apparatus. Along with this, the second print setting information is generated by rewriting the first print setting information of the document file so as to obtain the same print results of the divided document files as those of the document file before division.

The print process is executed based on second print setting information while decrypting the divided document file received in the printing apparatus. In particular, the decryption process of the printing apparatus is executed not in the HDD 104i serving as a nonvolatile memory but in the RAM serving as a volatile memory. Thus, even if the printing apparatus stops owing to a job trouble or the like, no decrypted print data before printing exists in the printing apparatus 104, ensuring security.

Since the job ticket is also rewritten upon dividing a document file, the same output results as those of the document file before division can be obtained.

Dividing a document file to be printed decreases the data amount of one document file, so the document file can be decrypted in a volatile memory (RAM) of a practical size. No decrypted document file need be temporarily saved in the HDD of the printing apparatus, and the print process can be executed more securely.

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or script data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-306301 filed on Nov. 27, 2007, which is hereby incorporated by reference herein in its entirety.

What is claimed is:

1. An information processing apparatus which manages document files to be output to a printing apparatus via a network, the information processing apparatus comprising:
a management unit configured to manage the document files by registering the document files in a storage medium;
a reception unit configured to receive, from the printing apparatus via the network, first print setting information of a document file to be printed out of the document files managed by said management unit;
an analysis unit configured to analyze the first print setting information;
a division unit configured to divide, based on an analysis result of said analysis unit, the document file into data each to be output on one print sheet to generate divided document files;
a rewriting unit configured to rewrite the first print setting information to generate second print setting information so as to obtain the same print results of the divided document files as print results of the document file before division;
an encryption unit configured to encrypt each divided document file generated by said division unit to generate an encrypted divided document file; and
a transmission unit configured to transmit, to the printing apparatus via the network, the encrypted divided document file generated by said encryption unit and the second print setting information generated by said rewriting unit.

2. The apparatus according to claim 1, wherein when a password is set for a document file to be registered, the document file is encrypted based on the password, and said management unit manages the document file by registering the document file in the storage medium.

3. The apparatus according to claim 1, further comprising:
an acquisition unit configured to, when the document file to be printed has been encrypted, acquire from the printing apparatus, a password for decrypting the document file; and
a decryption unit configured to decrypt the document file by using the password acquired by said acquisition unit,
wherein said encryption unit encrypts, by using the same password as the password acquired by said acquisition unit, the divided document file generated by said division unit to generate an encrypted divided document file.

4. A printing apparatus which acquires a document file to be printed from an information processing apparatus for managing document files, and prints the document file, the printing apparatus comprising:
a transmission unit configured to transmit, to the information processing apparatus via a network, first print setting information of a document file to be printed;

a reception unit configured to receive, from the information processing apparatus via the network, encrypted divided document files generated by the information processing apparatus by dividing, based on the first print setting information, the document file into data each to be output on one print sheet, and encrypting the divided document files, and second print setting information generated by rewriting the first print setting information so as to obtain the same print results of the divided document files as print results of the document file before division;

a decryption unit configured to decrypt each encrypted divided document file received by said reception unit to generate a divided document file; and a printing unit configured to print, based on the second print setting information, the divided document file generated by said decryption unit.

5. The apparatus according to claim 4, further comprising a storage unit configured to store the encrypted divided document file received by said reception unit in a nonvolatile memory, wherein said decryption unit acquires an encrypted divided document file to be processed from a plurality of encrypted divided document files stored in said storage unit, and decrypts the encrypted divided document file in a volatile memory to generate a divided document file, and said printing unit prints the divided document file generated by said decryption unit on the basis of the second print setting information.

6. The apparatus according to claim 5, further comprising a deletion unit configured to delete, respectively from the volatile memory and the nonvolatile memory, a divided document file and an encrypted divided document file which correspond to a divided document file printed by said printing unit.

7. An information processing system comprising an information processing apparatus which manages document files, and a printing apparatus which acquires a document file to be printed and prints the document file, the information processing apparatus comprising:
a management unit configured to manage the document files by registering the document files in a storage medium;
a first reception unit configured to receive, from the printing apparatus via a network, first print setting information of a document file to be printed out of the document files managed by said management unit;
an analysis unit configured to analyze the first print setting information;
a division unit configured to divide, based on an analysis result of said analysis unit, the document file into data each to be output on one print sheet to generate divided document files;
a rewriting unit configured to rewrite the first print setting information to generate second print setting information so as to obtain the same print results of the divided document files as print results of the document file before division;
an encryption unit configured to encrypt each divided document file generated by said division unit to generate an encrypted divided document file; and
a first transmission unit configured to transmit, to the printing apparatus, the encrypted divided document file generated by said encryption unit and the second print setting information generated by said rewriting unit, and the printing apparatus comprising:
a second transmission unit configured adapted to transmit the first print setting information to the information processing apparatus via the network;
a second reception unit configured to receive, from the information processing apparatus, the encrypted divided document file and the second print setting information corresponding to the encrypted divided document file;
a decryption unit configured to decrypt the encrypted divided document file received by said second reception unit to generate a divided document file; and
a printing unit configured to print, based on the second print setting information, the divided document file generated by said decryption unit.

8. A method of controlling an information processing apparatus which manages document files to be output to a printing apparatus via a network, the method comprising:
a management step of managing the document files by registering the document files in a storage medium;
a reception step of receiving, from the printing apparatus via the network, first print setting information of a document file to be printed out of the document files managed in the storage medium;
an analysis step of analyzing the first print setting information;
a division step of dividing, based on an analysis result of the analysis step, the document file into data each to be output on one print sheet to generate divided document files;
a rewriting step of rewriting the first print setting information to generate second print setting information so as to obtain the same print results of the divided document files as print results of the document file before division;
an encryption step of encrypting each divided document file generated in the division step to generate an encrypted divided document file; and
a transmission step of transmitting, to the printing apparatus via the network, the encrypted divided document file generated in the encryption step and the second print setting information generated in the rewriting step.

9. A method of controlling a printing apparatus which acquires a document file to be printed from an information processing apparatus for managing document files, and prints the document file, the method comprising:
a transmission step of transmitting, from the information processing apparatus via a network, first print setting information of a document file to be printed;
a reception step of receiving, from the information processing apparatus via the network, encrypted divided document files generated by the information processing apparatus by dividing, based on the first print setting information, the document file into data each to be output on one print sheet, and encrypting the divided document files, and second print setting information generated by rewriting the first print setting information so as to obtain the same print results of the divided document files as print results of the document file before division;
a decryption step of decrypting each encrypted divided document file received in the reception step to generate a divided document file; and
a printing step of printing, based on the second print setting information, the divided document file generated in the decryption step.

10. A non-transitory computer-readable medium storing a program configured to be executed at least by a computer to control an information processing apparatus which manages document files to be output to a printing apparatus via a network, the program including instructions for steps comprising:

a management step of managing the document files by registering the document files in a storage medium, a reception step of receiving, from the printing apparatus via the network, first print setting information of a document file to be printed out of the document files managed in the storage medium, an analysis step of analyzing the first print setting information, a division step of dividing, based on an analysis result of the analysis step, the document file into data each to be output on one print sheet to generate divided document files, a rewriting step of rewriting the first print setting information to generate second print setting information so as to obtain the same print results of the divided document files as print results of the document file before division, an encryption step of encrypting each divided document file generated in the division step to generate an encrypted divided document file, and a transmission step of transmitting, to the printing apparatus via the network, the encrypted divided document file generated in the encryption step and the second print setting information generated in the rewriting step.

11. A non-transitory computer-readable medium storing a program configured to be executed at least by a computer to control a printing apparatus which acquires a document file to be printed from an information processing apparatus for managing document files, and prints the document file, the program including instructions for steps comprising:

a transmission step of transmitting, to the information processing apparatus via a network, first print setting information of a document file to be printed, a reception step of receiving, from the information processing apparatus via the network, encrypted divided document files generated by the information processing apparatus by dividing, based on the first print setting information, the document file into data each to be output on one print sheet, and encrypting the divided document files, and second print setting information generated by rewriting the first print setting information so as to obtain the same print results of the divided document files as print results of the document file before division, a decryption step of decrypting each encrypted divided document file received in the reception step to generate a divided document file, and a printing step of printing, based on the second print setting information, the divided document file generated in the decryption step.

12. An information processing system comprising an information processing apparatus which manages document files, and a printing apparatus which acquires a document file to be printed and prints the document file, the information processing apparatus comprising:

a division unit configured to divide the document file into data each to be output on one print sheet or into pages of the document file to generate divided document files;

an encryption unit configured to encrypt each divided document file generated by said division unit to generate an encrypted divided document file; and a transmission unit configured to transmit, to the printing apparatus, the encrypted divided document file generated by said encryption unit, and the printing apparatus comprising:

a reception unit configured to receive the encrypted divided document file from the information processing apparatus;

a decryption unit configured to decrypt, in a volatile memory, the encrypted divided document file received by said reception unit to generate a divided document file; and a printing unit configured to print the divided document file generated by said decryption unit.

13. An information processing apparatus which manages document files to be output to a printing apparatus via a network, the information processing apparatus comprising:

a division unit configured to divide the document file into data each to be output on one print sheet or into pages of the document file to generate divided document files;

an encryption unit configured to encrypt each divided document file generated by said division unit to generate an encrypted divided document file; and a transmission unit configured to transmit, to the printing apparatus, the encrypted divided document file generated by said encryption unit.

14. A printing apparatus which acquires a document file to be printed from an information processing apparatus for managing document files, and prints the document file, the printing apparatus comprising:

a reception unit configured to receive, from the information processing apparatus, encrypted divided document files generated by the information processing apparatus by dividing the document file into data each to be output on one print sheet or into pages of the document file;

a decryption unit configured to decrypt, in a volatile memory, each encrypted divided document file received by said reception unit to generate a divided document file; and a printing unit configured to print the divided document file generated by said decryption unit.

15. A method of controlling an information processing apparatus which manages document files to be output to a printing apparatus via a network, the method comprising:

a division step of dividing the document file into data each to be output on one print sheet or into pages of the document file to generate divided document files;

an encryption step of encrypting each divided document file generated in the division step to generate an encrypted divided document file; and a transmission step of transmitting, to the printing apparatus, the encrypted divided document file generated in the encryption step.

16. A method of controlling a printing apparatus which acquires a document file to be printed from an information processing apparatus for managing document files, and prints the document file, the method comprising:

a reception step of receiving, from the information processing apparatus, encrypted divided document files generated by the information processing apparatus by dividing the document file into data each to be output on one print sheet or into pages of the document file;

a decryption step of decrypting, in a volatile memory, each encrypted divided document file received in the reception step to generate a divided document file; and a printing step of printing the divided document file generated in the decryption step.

17. A non-transitory computer-readable medium storing a program configured to be executed at least by a computer to control an information processing apparatus which manages document files to be output to a printing apparatus via a network, the program including instructions for steps comprising:

a division step of dividing the document file into data each to be output on one print sheet or into pages of the document file to generate divided document files, an encryption step of encrypting each divided document file generated in the division step to generate an encrypted divided document file, and a transmission step of transmitting, to the printing apparatus, the encrypted divided document file generated in the encryption step.

18. A non-transitory computer-readable medium storing a program configured to be executed at least by a computer to control a printing apparatus which acquires a document file to be printed from an information processing apparatus for managing document files, and prints the document file, the program including instructions for steps comprising:

a reception step of receiving, from the information processing apparatus, encrypted divided document files generated by the information processing apparatus by dividing the document file into data each to be output on one print sheet or into pages of the document file, a decryption step of decrypting, in a volatile memory, each encrypted divided document file received in the reception step to generate a divided document file, and a printing step of printing the divided document file generated in the decryption step.

* * * * *